United States Patent
Conner et al.

(10) Patent No.: US 12,388,677 B2
(45) Date of Patent: *Aug. 12, 2025

(54) MONITORING DATA LINK HEALTH USING CONNECTIONLESS LOOPS OVER REDUNDANT IP NETWORKS

(71) Applicant: Edgewater Networks, Inc., San Jose, CA (US)

(72) Inventors: Mark J. Conner, Henderson, NV (US); Brian M. Quigley, Sunnyvale, CA (US); Michael P. Reiman, Santa Cruz, CA (US)

(73) Assignee: Edgewater Networks, Inc., San Jose, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 17/977,790

(22) Filed: Oct. 31, 2022

(65) Prior Publication Data

US 2023/0049713 A1   Feb. 16, 2023

Related U.S. Application Data

(63) Continuation of application No. 15/980,046, filed on May 15, 2018, now Pat. No. 11,489,698.
(Continued)

(51) Int. Cl.
*H04L 12/46* (2006.01)
*H04L 43/0811* (2022.01)
(Continued)

(52) U.S. Cl.
CPC ...... *H04L 12/4633* (2013.01); *H04L 43/0811* (2013.01); *H04L 43/0847* (2013.01);
(Continued)

(58) Field of Classification Search
None
See application file for complete search history.

(56) References Cited

U.S. PATENT DOCUMENTS

2006/0106929 A1* 5/2006 Kenoyer ............... H04L 65/403
709/224
2009/0089440 A1* 4/2009 Gathman ................ H04L 67/14
709/228

(Continued)

*Primary Examiner* — Peter Chen
(74) *Attorney, Agent, or Firm* — Brooks, Cameron & Huebsch, PLLC

(57) ABSTRACT

Devices, methods, systems, and computer-readable media for using connectionless loops for monitoring data link health using connectionless loops over redundant Internet Protocol (IP) networks are described herein. One system includes an IP network device connected to a device used by a party to communicate with another party through an IP network, a first network device operating a first network and referring to the IP network device with a first identifier, a second network device operating a second network and referring to the IP network device with a second identifier, an intermediary device allowing communication between the first and second networks, and instructions to create a connectionless packet, send the packet through the first network addressed to the second identifier, such that the packet is routed from the first network to the intermediary device and into the second network based on the second identifier, and receive the packet.

19 Claims, 3 Drawing Sheets

Related U.S. Application Data

(60) Provisional application No. 62/625,330, filed on Feb. 1, 2018.

(51) Int. Cl.
  *H04L 43/0823* (2022.01)
  *H04L 43/0852* (2022.01)
  *H04L 43/10* (2022.01)
  *H04L 43/18* (2022.01)
  *H04L 43/50* (2022.01)

(52) U.S. Cl.
  CPC .......... *H04L 43/0858* (2013.01); *H04L 43/10* (2013.01); *H04L 43/18* (2013.01); *H04L 43/50* (2013.01)

(56) References Cited

U.S. PATENT DOCUMENTS

| | | |
|---|---|---|
| 2014/0177460 A1 | 6/2014 | Keskkula et al. |
| 2017/0324628 A1 | 11/2017 | Dhanabalan |
| 2018/0077068 A1 | 3/2018 | Dhanabalan |
| 2018/0337833 A1* | 11/2018 | Attarwala ............... H04L 45/22 |

* cited by examiner

MONITORING DATA LINK HEALTH USING CONNECTIONLESS LOOPS OVER REDUNDANT IP NETWORKS

PRIORITY INFORMATION

This application is a continuation of U.S. Application Ser. No. 15/980,046 filed May 15, 2018, which claims priority of U.S. Provisional Application Ser. No. 62/625,330, filed on Feb. 1, 2018, the content of which are incorporated herein by reference.

TECHNICAL FIELD

The present disclosure relates to methods, devices, systems, and computer-readable media for monitoring data link health using connectionless loops over redundant Internet Protocol (IP) networks.

BACKGROUND

Diagnosing link layer impairments on inactive data links has several solutions. One solution is to connect the data link on one side to a test device while looping the other side back on itself. A pseudo-random signal is then sent by the test device, which via the loopback, will receive an exact copy of the data back. All such solutions have one thing in common, which is that no active data can be sent at the same time that the test is being conducted.

Diagnosing link layer impairments on active data links is a much more complicated problem. Any testing on the link will reduce the available amount of bandwidth for the active data. For example, one high-level test method is to connect a session to an external speed test site (Ookla is one current example). For a few seconds, a large amount of data is sent on the data link to get a current speed of the link. This test works well in some implementations, but has drawbacks. For example, the test only provides an indication of how much extra bandwidth is available on the link and provides only a very limited snapshot of a link's performance, and due to the use of the active link for accomplishing the test, it can slow down active data being sent.

One area in which such active link testing is not well suited is Voice over Internet Protocol (VoIP) communications. Many organizations use a VoIP communication system to communicate rather than traditional analog or digital (Time Division Multiplex) TDM telephone communication systems. As with all communication systems, the ability to connect the parties wanting to speak to each other over a VoIP system and to maintain that connection, during their intended communication period, is important. The voice and/or video is time-sensitive, requiring fast methods for detecting impairments.

Some keys to maintaining the connection are noticing that a current connection is bad or failing, timing a switch to an alternative pathway for the communication, and making a smooth transition of the communication between the parties from the current communication link to a redundant link to minimize disruption of the exchange between the parties. With these keys in mind, providers of data services have developed mechanisms and processes to assist link problem detection and transition.

As indicated above, some systems utilize redundant link(s) that can be switched to, if a current link is having difficulty maintaining the connection or the quality of the connection which is affecting the parties' ability to communicate with each other.

In some such systems, the primary and redundant links can be used by a network device, for example, having two or more public wide area network (WAN) data links, one for a primary connection and one or more for redundancy, in case the primary link becomes unreliable or inaccessible. One simple method for detecting link problems is to use Internet Control Message Protocol (ICMP) to ping one or more public remote servers or gateways (i.e., outside of the local VoIP environment that is connecting a call to one party of a multiple party VoIP connection) across the network (e.g., WAN) link (primary or redundant) to detect problems on the link.

This testing can, for example, identify if data is being transmitted correctly, if one or more packets are being delayed or lost, and other details that may be helpful with respect to whether a link for communication between parties will be successful.

However, many public services drop ICMP pings or severely limit the rate ICMPs responses are sent to the requestor. Although the method may be suitable for slower detection situations, it usually is unsuitable for faster detection which is often needed in the VoIP field as call connections cannot have long periods of interruption or a party to the call will hang up.

Additionally, using a remote server to receive pings makes the testing of the links reliant on the remote server that is outside of the control of the local VoIP environment. Accordingly, issues can arise with the link to the remote server or to the remote server itself that may not be known to the local VoIP device.

For example, in some situations, the server being pinged through the WAN may go down and when a ping response is not received from that server, the VoIP device that sent the ping may assume the link is not working and cause an unnecessary switch to the redundant link.

In some instances, attackers use pings to attempt to create a denial of service (DOS) condition within the system. Accordingly, some systems monitor the amount of ping messages received to determine whether the system is being attacked. If the network device is sending pings to the server too frequently, the server being pinged may misinterpret the pings as an attack and begin to refuse incoming pings from the address of the network device. If this happens, such an action may be interpreted by the network device as a bad link and cause an unnecessary switch to the redundant link.

When the only link checking mechanism is ICMP (the Network Layer of the Open System Interconnection Model (also referred to as layer 3)), no other higher layer protocols are being tested or monitored. Accordingly, a link may be sending and receiving ICMP pings, but may be having issues on other, higher layer protocols.

Also, since pings are used for a different purpose than communicating between parties, the ICMP messaging only gives an indirect indication of the health of the link.

A method is needed to make sure a connection between the networks is healthy. There are two common classification types for major faults that may be present on the connection between the networks. These types of faults are: layer 1 faults indicating that the device is down (e.g., a fault in which the physical device cannot electrically connect to the next device in the network connection (e.g., a node). Layer 1 faults can be due to many reasons including a data interface that has been administratively set to unusable or the interface is unplugged from the next hop network device), and layer 2 or higher faults (e.g., IP/TCP/UDP/RTP/SIP/H.323/MGCP, etc.).

As discussed above, one way to detect layer 3 connection problems is to use a test data stream between two devices with an ICMP ping process. The traditional way would be to send data to an external server and monitor the health of the connection on both ends.

This requires setting up or accessing an external server that can handle data from the device needing to test. If this concept is used for each network device, it is likely that such a server would be used to test all such devices. This would be an expensive proposition, since the data bandwidth/server power needed would grow with each device sold by device provider. Also, the system holding the remote server would need to have extremely high availability, using multiple physical locations, multiple physical servers, each with redundant data connections, and UPS power.

As discussed above, these traditional solutions are often too slow to work in the VoIP field or other time sensitive fields. Additionally, they can be cost prohibitive if many devices are using the same testing system.

DETAILED DESCRIPTION

Figure 1:
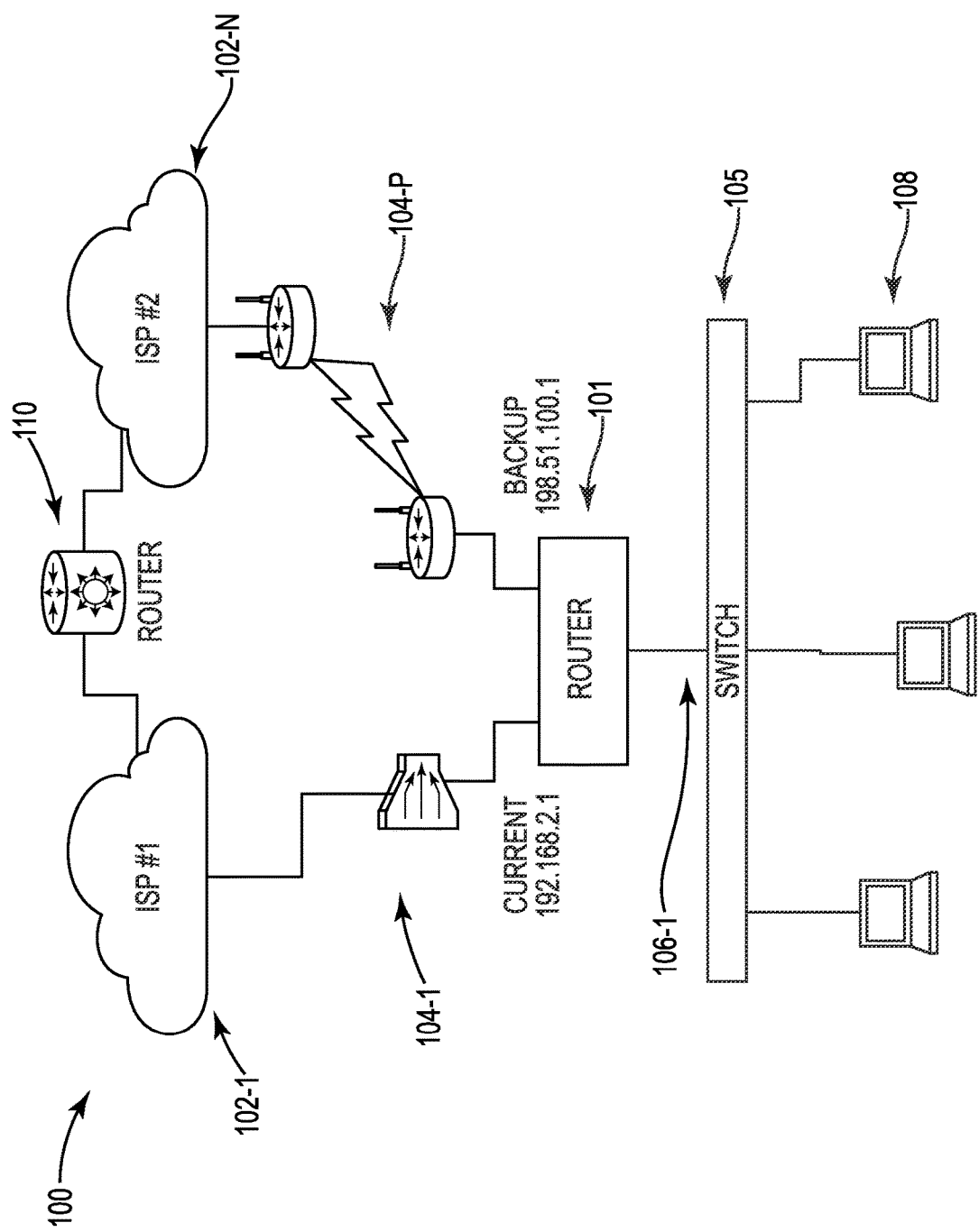
FIG. 1 illustrates an example of a system for use in determining the health of network links to an IP network device according to one or more embodiments of the present disclosure.

In embodiments of the present disclosure, in order to determine the health of a connection, independent data link(s) on the device can be used to help test the active data link providing connections. This implementation does not use a remote server to interact with the local IP network device to ascertain the health of a connection, nor does it require a large amount of the available bandwidth. It also works in a constant manner to attempt to identify problems quickly. Such an implementation eliminates the need for the remote server and a connection therewith, which can be beneficial in saving cost, hardware, and time.

The embodiments of the present disclosure attempt to assist an IP network device (e.g., a VoIP device), attempting to establish a communication between parties through a diagnosis of network link problems using a connectionless protocol, such as the User Datagram Protocol (UDP) of layer 4 (Transport Layer). Even though this concept is discussed as using VoIP (SIP specifically) as the example application layer protocol, any layer 5 or higher layer protocol that needs time sensitive link performance can benefit from this concept.

As discussed herein, this concept can be accomplished using at least two network loops to pass connectionless data streams to a single device. In this manner, a single device can test two or more network connections to see if they are failing or bad connections prior to connection of a communication between two parties or during the connection. If three or more network connections are used, they can be tested in pairs to determine which network links are failing or bad.

For example, if three links are available, links 1 and 2 and 1 and 3 can be linked together and tested. If both tests identify a problem, then it is likely that link 1 is problematic.

If only the first test indicates a problem, then it is likely link 2 has a problem. This could be further confirmed by testing links 2 and 3 together and, potentially 1 and 3 together, to see if those link combinations show any problems. Additional confirmation can be done with a test, such as the ICMP ping test described herein among other suitable tests.

In this manner, some data can be obtained on the health of the connected public networks at a layer 4 level. Since the IP network device sending the connectionless packet is sending it to itself from a first network link and back through a second network link, it will know what is expected to be received on the second link. By using this knowledge, the local IP network device can determine if one or more packets are taking longer than expected to traverse the path, if they get lost, or if they are taking bit errors.

The embodiments of the present disclosure open a connection between a first link and a second link and then connectionless one or more packets are sent from the first link to the second link. The device receiving the packet (e.g., time stamp, sequence number, and pseudo-random bit pattern) knows what the packet should look like, since it was also the sender of the packet. Additionally, a connection can be created from the second link to the first link and a similar test can be done in that direction. This can verify the results of the first test.

UDP is one suitable type of protocol that can be used in embodiments of the present disclosure. It can be beneficial as the packet data can be small (e.g., 19 bytes—with data such as: direction the packet is going, what sequence number in time it is, time stamp relative to the device that is sending the packet, and pseudo random bit error bits.) This information can be processed quickly.

UDP is a connectionless protocol that allows a packet to be sent out and there is no indication given to a lower level stack that the packet was ultimately received by another device. UDP, by definition, does no retransmit of packets, or error checking, so if the packet is lost or receives errors, there will be no retry of sending the packet. By using UDP packets, packets can potentially be sent more frequently than ICMP pings (e.g., in some systems, pings can typically be sent every few seconds without causing a reaction from the server, while UDP packets can be sent up to the limit that the sending device can generate and/or the receiving device can process, if desired), but the flood of UDP packets won't risk triggering a DOS block from the receiving server routing the packet from the first network link to the second network link since it is not going to any external server.

The use of the connectionless looping concept can be particularly beneficial when used with one or more other failure determination methods. For example, the connectionless loop concept can be used in compliment to the ICMP ping method. In such an embodiment, the connectionless looping concept can indicate that there is a problem (e.g., one or more packets are lost, or one or more packets are late) somewhere in the first link or second link when a packet is passed from the first link to the second link and can be confirmed by an indication that there is a problem when a packet is passed from the second link to the first link.

But, in a system where two network links are used for testing, the system can be uncertain whether the problem is on the first link or the second link. When used with an ICMP ping process, a ping can be sent on the first link and separately on the second link and through the ping process, the issue should be evident on one of the two links.

Although still using a remote server in this instance to route level 3 ICMP packets, its usage is minimal because instead of sending pings all the time, a ping only needs to be sent when the UDP loops determine a possible problem in one of the links.

It should be noted that the UDP looping concept could be used in a system where ICMP pinging is occurring on a regular basis as well. As can be seen from these examples, the use of UDP looping in conjunction with other determination methods can significantly improve the certainty of identifying an issue, without significantly taxing the systems resources or creating invalid DOS attack reactions.

In the following portion of the detailed description, reference is made to the accompanying figures that form a part hereof. The figures show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

Also, as used herein, "a" or "a number of" something can refer to one or more such things. For example, "a number of operations" can refer to one or more operations.

The present disclosure also uses the letters M, N, and P to along with the numbers in the figures to illustrate that those items can have any number of such items above the number previously used to describe that item. For example, 101 and 101-M are used which means that M can represent any number larger than 1. Accordingly, M could represent the $2^{nd}$ such item, the $5^{th}$ such item, the $1000^{th}$ such item, etc.

FIG. 1 illustrates an example of a system for use in determining the health of network links to an IP network device according to one or more embodiments of the present disclosure. In the embodiment illustrated in FIG. 1, the system 100 includes a number of IP network devices 101 (in the example of FIG. 1, these are VoIP devices), a number of networks 102-1, 102-N (e.g., WAN networks), a number of network links 104-1, 104-P (wired or wireless), a number of local networks 106, a number of end communication devices that a party may use to communicate with another party over a connection through one of the network links 104-1, 104-P, and a number of intermediary devices 110 that provide a pathway to allow the passing of packets between networks 102-1, 102-N. The system 100, shown in FIG. 1, includes two network connections (via networks 102-1 and 102-N) that can each be used by a party using the end device 108 to communicate with another party on a network that is communicating through intermediary device 110.

As can be seen from the illustration in FIG. 1, a VoIP computing device 101 is connected to links to several networks. For instance, link 104-1 allows connection to network 102-1 (ISP #1) and a unique IP address is provided to identify the device 101 with respect to that network. Link 104-P allows connection to network 102-N (ISP #2) and a unique IP address (different from that used for network 102-1) is provided to identify the device 101 with respect to that network. Additionally, VoIP device 101 is also connected to a local network (LAN) through link 106-1 and a unique IP address (different from those used for networks 102-1, 102-N) is provided to identify the device 101 with respect to that network.

These unique IP addresses can be used to indicate where the connectionless packets are to be directed. For example, if the VoIP device is referred to as 198.51.100.1 for the network 102-N, then when sending through network 102-1, the packet can be directed toward that address.

It will leave the VoIP device 101 pass through network 102-1, through the intermediary devices 110, and into 102-N, where it will be directed to 198.51.100.1, which is VoIP device 101. As can be understood from this path, the journey of the packet forms a loop, starting from VoIP device 101 and ending at 101. Using this loop, the device can monitor its own connections 102-1, 102-N.

Additionally, the loop can be reversed, by sending one or more packets through network 102-N, through intermediary devices 110, and into 102-1, where it will be directed to 192.168.2.1 (which is the unique IP address used to identify VoIP device 101 on network 102-1. When these two loops are used in conjunction, the system can have additional certainty that a problem on one of the links (pathways including 104-1, 102-1, 110, 102-N, and 104-P) is present. As discussed above, if two or more loops are available, further evidence can be produced to refine where the problem is located.

Although it can be beneficial to use multiple WAN type networks for accomplishing these monitoring functions, it may be possible to accomplish these functions using multiple local area networks (LANs) or a mix of LANs and WANs, wherein two or more networks have connectivity to each other external to the network interface devices sharing data between networks (e.g., source/sink devices).

The analysis of this testing data can be accomplished on the network device 101 or elsewhere on the system 100. To accomplish this analysis, the analyzing device (e.g., 101) can include a processor and a memory. The memory can have various types of information including data and executable instructions that can be executed by the processor to accomplish the construction of packets, the sending of the packets, receiving the packets, extracting its contents, and analyzing its contents, as discussed herein.

The present disclosure includes method, device, and system embodiments for monitoring data link health using connectionless loops over redundant Internet Protocol (IP) networks. Provided below are some examples of these types of embodiments.

One system embodiment includes an IP network device 101 that is connected to an end device 108 used by a first party to communicate with a second party through an IP network connection via the IP network device 101. In this manner, the users can use end devices to communicate with each other over a network connection that passes through several network devices.

The system also includes a first network device 102-1 operating a first network 104-1 connected to the IP network device 101 and referring to the IP network device 101 with a first identifier 192.168.2.1 and a second network device 102-N operating a second network 104-P connected to the IP network device 101 and referring to the IP network device 101 with a second identifier 198.51.100.1 that is different from the first identifier. An intermediary device 110 is also in the system and allows communication of packets between the first and second networks. This arrangement represents the primary and secondary networks that are connected at the intermediary device (e.g., a SIP server, for instance).

Further, the system includes executable instructions stored in memory (e.g., on the IP network device and executed by a processor thereon) that execute to create a connectionless protocol packet, send the packet through the first network addressed to the second identifier, such that the packet is routed from the first network to the intermediary device and into the second network based on the second identifier, and receive the packet from the second network. These packets traverse the first and second networks and can be used to check the characteristics of the first and second networks as discussed herein. This information can be used to determine the health status of each network In some embodiments, the system includes executable instructions to analyze the received packet to determine if the packet is corrupted, lost, or late. This can be accomplished by looking at the contents of the packet to see if the packet arrived in the same condition as when it was sent. Since the sending and receiving device are the same device, this comparison can be readily done. As discussed herein, a time stamp or other timing information can also be included in the packet and the time information can be used to determine how long the packet was in transit through the first and second networks.

Embodiments can also include executable instructions stored in memory that execute to create multiple connectionless packets. The packets can then be sent through the first network addressed to the second identifier, such that the packets are routed from the first network to the intermediary device and into the second network, based on the second identifier, and receive at least some of the packets from the second network. Ideally, all packets will be received, but some may be lost in transit. Systems can also include executable instructions to analyze the received at least some of the packets to determine if any of the packets are corrupted, missing, or late.

In some embodiments, the first network can be either a Wide Area Network (WAN) or a Local Area Network (LAN). The second and additional networks can be either a WAN or a LAN. In this manner, two or more WANs, two or more LANs, or a mix of network types can be used with the embodiments of the present disclosure.

An example Internet Protocol (IP) network device embodiment for monitoring data link health using connectionless loops over redundant Internet Protocol networks can, for example, include a connection to an end device used by a first party to communicate with a second party through an IP network connection via the IP network device. The IP network device also includes a connection to a first network device operating a first network connected to the IP network device and referring to the IP network device with a first identifier.

Further, the IP network device has a connection to a second network device operating a second network connected to the IP network device and referring to the IP network device with a second identifier that is different from the first identifier. The example IP network device also has executable instructions stored in memory that execute to create a connection less protocol packet, send the packet through the first network addressed to the second identifier, such that the packet is routed from the first network to an intermediary device that allows communication of packets between the first and second networks and into the second network based on the second identifier, and receive the packet from the second network.

In some device embodiments, the IP network device includes executable instructions to analyze the received packet to determine if the packet is corrupted or late. The IP network device can also include executable instructions stored in memory that execute to create multiple connectionless packets, send the packets through the first network addressed to the second identifier, such that the packets are routed from the first network to the intermediary device and into the second network based on the second identifier, and receive at least some of the packets from the second network.

In some embodiments, the executable instructions include instructions to analyze the received at least some of the packets to determine if any of the packets are corrupted, missing, or late.

The IP network device can also have executable instructions to create a layer 4 connectionless protocol packet. For example, executable instructions can also include instructions to create a UDP connectionless protocol packet.

The IP network device also can include executable instructions stored in memory that execute to create a connectionless protocol packet, send the packet through the second network addressed to the first identifier, such that the packet is routed from the second network to the intermediary device and into the first network based on the first identifier, and receive the packet from the first network.

The processor can execute instructions that are stored in memory, for example, on an internal or external non-transitory computer device readable medium (CRM). A non-transitory CRM, as used herein, can include volatile and/or non-volatile memory. Volatile memory can include memory that depends upon power to store information, such as various types of dynamic random access memory (DRAM), among others. Non-volatile memory can include memory that does not depend upon power to store information.

Memory and/or the processor may be located on the network device 101 or off of the computing device, in some embodiments. As such, as illustrated in the embodiment of FIG. 1, the network device 101 can include a network interface having input and/or output capabilities. Such an interface can allow for processing on another networked computing device and/or can be used to obtain data and/or executable instructions for use with various embodiments provided herein.

An example non-transitory computer readable medium embodiment having instructions thereon that are executable by a processor for monitoring data link health using connectionless loops over redundant Internet Protocol (IP) networks includes connecting an end device used by a first party to communicate with a second party through an IP network connection via an IP network device. The medium also includes instructions for connecting a first network device operating a first network connected to the IP network device and referring to the IP network device with a first identifier, connecting a second network device operating a second network connected to the IP network device and referring to the IP network device with a second identifier that is different from the first identifier.

The medium also includes creating a connectionless protocol packet, send the packet through the first network addressed to the second identifier, such that the packet is routed from the first network to an intermediary device that allows communication of packets between the first and second networks and into the second network based on the second identifier, and receive the packet from the second network.

A non-transitory computer readable medium embodiment can also include the instructions are executable for connecting a third network device operating a third network connected to the IP network device and referring to the IP network device with a third identifier that is different from the first identifier and second identifier. As described herein, the use of three or more networks allows for a more sophisticated testing process that can provide more certainty about whether a network is inoperable or degraded.

The medium can also include instructions that are executable to create multiple connectionless packets, send the packets through the second network addressed to the first identifier, such that the packets are routed from the second network to the intermediary device and into the first network based on the first identifier, and receive at least some of the packets from the first network.

Further, the instructions can be executable to create multiple connectionless packets, send the packets through the first network addressed to the third identifier, such that the packets are routed from the first network to the intermediary device and into the third network based on the third identifier, and receive at least some of the packets from the third network. In some such embodiments, the instructions are executable to create multiple connectionless packets, send the packets through the third network addressed to the first identifier, such that the packets are routed from the third network to the intermediary device and into the first network based on the first identifier, and receive at least some of the packets from the first network.

As illustrated in the embodiment of FIG. 1, the network device 101 can be connected to a user interface (e.g., computing device shown at 108) that allows a user to review instructions and/or data on the device. Such an interface can be used to review data packets, check the analysis of the data, change the parameters of the test (direction of travel of the packets, type of information sent, timing of packets, networks to be traversed by the packets, etc.), or change the frequency of the tests, among other functions.

Figure 2:
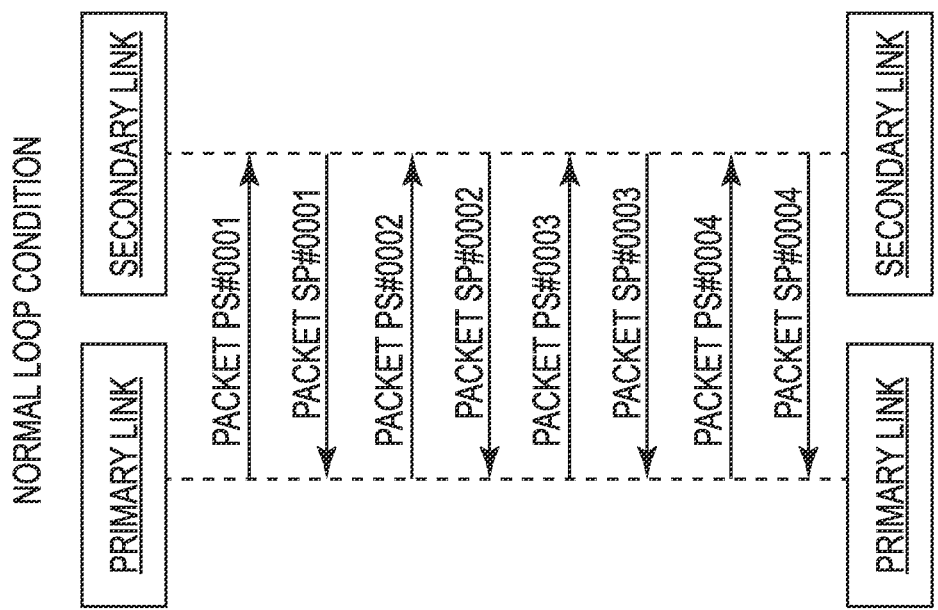
FIG. 2 illustrates a normal connectionless packet looping process according to one or more embodiments of the present disclosure.

FIG. 2 illustrates a normal connectionless packet looping process according to one or more embodiments of the present disclosure. FIG. 2 shows a primary link and a secondary link. Although only two links are shown, the links can be an active link (e.g., primary is current link of FIG. 1) and one or more inactive links (e.g., secondary is backup link of FIG. 1) or multiple inactive links that can be checked for use in anticipation for when an active link has a problem.

As discussed above, a first packet (e.g., Packet PS-#0001) is sent from the IP network device to itself from the primary link (e.g., using its unique address for the secondary link, for example, 198.51.100.1 for the backup link in FIG. 1). It then travels from the primary link to the secondary link and is delivered to the IP network device via the secondary link. Further, as discussed above, a packet can be sent in the reverse direction (e.g., from the secondary link, addressed to the unique address (e.g., 192.168.2.1 for the current link in FIG. 1) to the primary link). This is shown as Packet SP #0001. In the flow diagram of FIG. 2, the PS stands for primary to secondary and SP for secondary to primary. As can be seen from this figure many packets can be sent over time to frequently or continually monitor the condition of the primary and one or more secondary links.

Figure 3:
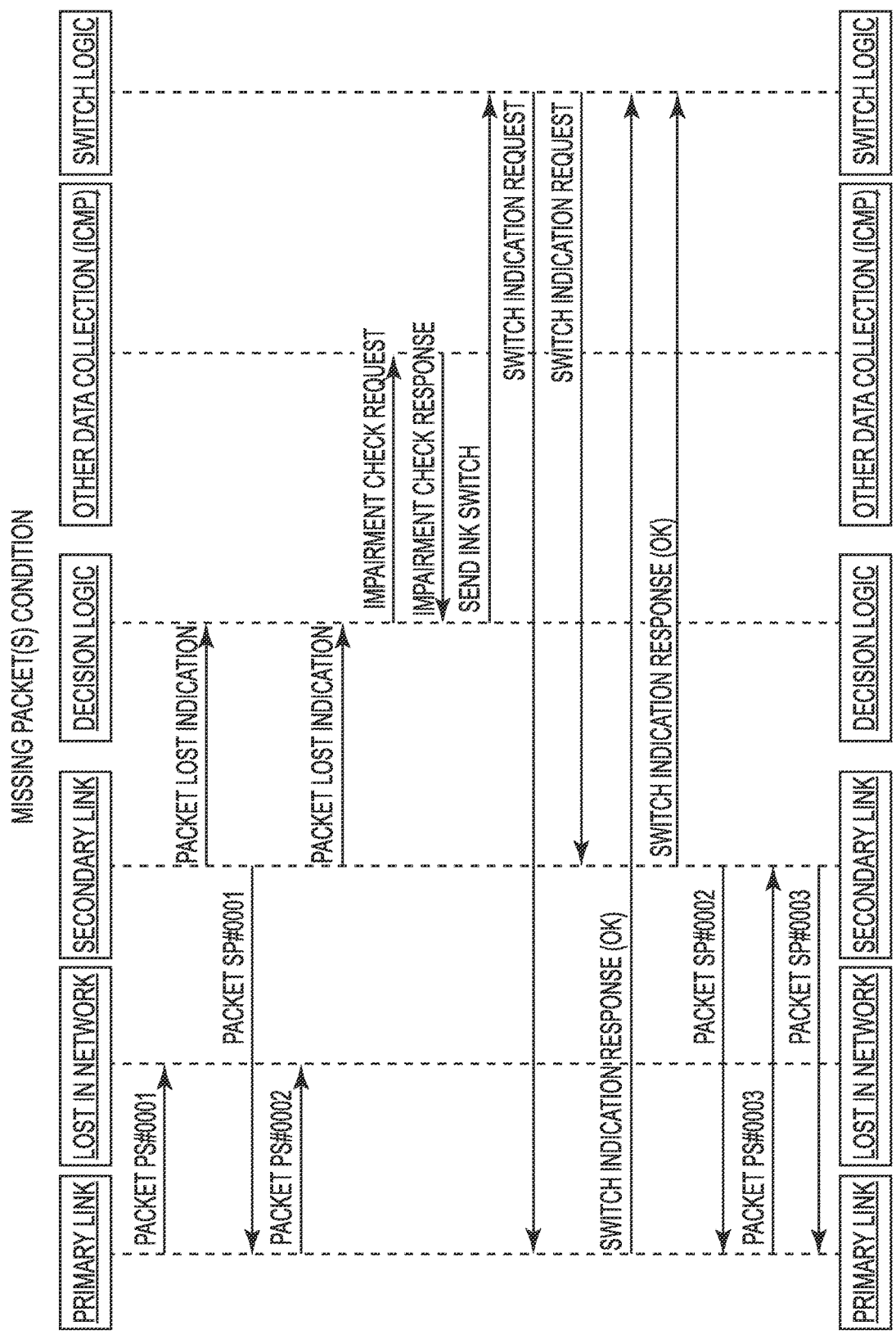
FIG. 3 illustrates a connectionless packet looping process that indicates one or more packets are missing according to one or more embodiments of the present disclosure.

FIG. 3 illustrates a connectionless packet looping process that indicates packets are missing according to one or more embodiments of the present disclosure. FIG. 3 shows a flow chart that illustrates how the system determines whether to switch links based on the loss of packets on that link.

In this example, the packet PS #0001 is sent on the primary link from the IP network device to itself via the secondary link. However, the packet gets lost in transit and never is received from the secondary link. It could also be outside of a threshold delivery period. This can be the case in VoIP or other fields where the data packets must be timely received or the call between parties will be garbled and not understandable or will have long gaps between sounds that can make understanding the conversation difficult.

Accordingly, since Packet PS #0001 has been lost, a lost packet indication is generated (e.g., by the IP network device or the secondary link) and provided to the systems decision logic (e.g., that may be resident on the IP network device).

In this example, a packet SP #0001 is sent the reverse path, which indicates to the system that the pathway through the secondary and primary links is working.

Again, a packet (Packet PS #0002) is sent on the primary link from the IP network device to itself via the secondary link. However, the packet gets lost in transit and never is received from the secondary link. A lost packet indication is again generated and provided to the systems decision logic.

In the example system, the threshold for lost packets is set to two packets and since this is the second packet to be lost during a predetermined time period, the system also generates an impairment check request. The impairment check request initiates another type of checking process to provide more certainty that there is a problem with either, the primary link or the secondary link.

In the example of FIG. 3, an ICMP ping is requested. The ping is initiated and returns a determination that the primary link is impaired.

Upon receiving the notification that the primary link is impaired, the system's decision logic sends a link switch message to the system's switch logic. The switch logic sends a switch indication request to the primary link and the secondary link and they, in turn, return an acknowledgement to the switch logic.

Once the switch is made, the IP network device begins sending packets, with Packet SP #0002 sent from the secondary link (now acting as the primary link) to the primary link (now acting as the secondary link. The example shows that this arrangement is functioning properly as packets PS #0003 and SP #0003 are sent and received properly.

The system can continue to operate indefinitely with the secondary link taking on the role of the primary, or communications can be switched back to the primary link after a threshold time period has passed. In embodiments where the communication switch back after a time period has passed, the primary link can be rechecked to make sure it is no longer impaired. This checking can be done by the method above or by another suitable method (ICMP ping only, etc.)

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. An Internet Protocol (IP) network device, comprising:
a memory comprising executable instructions; and
a processor configured to execute the executable instructions to:
send a packet using a connectionless protocol from the IP network device through a first network and a second network;
receive the packet at the IP network device; and
determine health of at least one of: the first network or the second network based on whether the packet is corrupted, lost, or late at the IP network device by comparing contents of the packet including a pseudo-random bit pattern prior to sending the packet from the IP network device to contents of the packet subsequent to sending the packet through the first network and the second network and receiving the packet at the IP network device.

2. The device of claim 1, wherein the processor is configured to execute the executable instructions to create the packet.

3. The device of claim 1, wherein the connectionless protocol is a User Datagram Protocol (UDP).

4. The device of claim 1, wherein the connectionless protocol is of a transport layer.

5. The device of claim 1, wherein the processor is configured to execute the executable instructions to:
send a different packet from the IP network device through the second network and the first network;
receive the different packet at the IP network device; and
determine health of at least one of: the first network or the second network based on whether the different packet is corrupted, lost, or late.

6. The device of claim 5, wherein the different packet is addressed to a first identifier.

7. The device of claim 6, wherein the packet is addressed to a second identifier.

8. A system, comprising:
a first network;
a second network;
an intermediary device configured to allow communication of packets between the first network and the second network; and
an Internet Protocol (IP) network device configured to:
send a packet using a connectionless protocol from the IP network device through the first network, the intermediary device, and the second network;
receive the packet at the IP network device; and
determine health of at least one of: the first network or the second network based on whether the packet is corrupted, lost, or late by comparing contents of the packet including a pseudo-random bit pattern prior to sending the packet from the IP network device to contents of the packet subsequent to sending the packet through the first network and the second network and receiving the packet at the IP network device.

9. The system of claim 8, wherein the IP network device is configured to address the packet to a first identifier, wherein the packet is routed from the second network to the intermediary device and into the first network in response to addressing the packet to the first identifier.

10. The system of claim 9, wherein the IP network device is configured to address the packet to a second identifier, wherein the packet is routed from the first network to the intermediary device and into the second network in response to addressing the packet to the second identifier, wherein the second identifier is different from the first identifier.

11. The system of claim 8, further comprising an end device coupled to the IP network device.

12. The system of claim 11, wherein the end device is a computing device.

13. The system of claim 8, wherein the first network is a Wide Area Network (WAN) and the second network is a WAN.

14. The system of claim 8, further comprising a first network device configured to operate the first network.

15. The system of claim 8, further comprising a second network device configured to operate the second network.

16. A non-transitory computer readable medium having instructions thereon that are executable by a processor, comprising:
sending a packet using a connectionless protocol from an Internet Protocol (IP) network device through a first network, an intermediary device, and a second network;
receiving the packet at the IP network device; and
determining, at the IP network device, health of at least one of: the first network or the second network based on whether the packet is corrupted, lost, or late by comparing contents of the packet including a pseudo-random bit pattern prior to sending the packet from the IP network device to contents of the packet subsequent to sending the packet through the first network and the second network and receiving the packet at the IP network device.

17. The non-transitory computer readable medium of claim 16, wherein the instructions are executable to connect an end device to the IP network device.

18. The non-transitory computer readable medium of claim 17, wherein the instructions are executable to connect the IP network device to a first network device operating the first network.

19. The non-transitory computer readable medium of claim 18, wherein the instructions are executable to connect the IP network device to a second network device operating the second network.

* * * * *